United States Patent
Fong et al.

(10) Patent No.: US 11,782,946 B2
(45) Date of Patent: Oct. 10, 2023

(54) AUTOMATIC TAG MAPPING AND GENERATION FROM DATA STRING

(71) Applicant: SCHNEIDER ELECTRIC SOFTWARE, LLC, Lake Forest, CA (US)

(72) Inventors: Yuk Ming Fong, Irvine, CA (US); Alvaro Martinez, Irvine, CA (US); John Ralph Bartlett, Foothill Ranch, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 41 days.

(21) Appl. No.: 16/642,435

(22) PCT Filed: Aug. 31, 2018

(86) PCT No.: PCT/US2018/049142
§ 371 (c)(1),
(2) Date: Feb. 27, 2020

(87) PCT Pub. No.: WO2019/046749
PCT Pub. Date: Mar. 7, 2019

(65) Prior Publication Data
US 2020/0280609 A1    Sep. 3, 2020

Related U.S. Application Data

(60) Provisional application No. 62/552,580, filed on Aug. 31, 2017, provisional application No. 62/552,596, filed on Aug. 31, 2017.

(51) Int. Cl.
*H04L 29/08* (2006.01)
*G06F 16/25* (2019.01)
(Continued)

(52) U.S. Cl.
CPC ....... *G06F 16/258* (2019.01); *G05B 19/4183* (2013.01); *G05B 19/41875* (2013.01);
(Continued)

(58) Field of Classification Search
CPC ...... G06F 16/258; G06F 16/168; G06F 16/22; G06F 16/248; G06F 40/117;
(Continued)

(56) References Cited

U.S. PATENT DOCUMENTS

2003/0158854 A1\* 8/2003 Yoshida ................ G06F 16/258
2007/0156737 A1\* 7/2007 Barnes .................. G06F 16/258
(Continued)

OTHER PUBLICATIONS

Extended European Search Report for corresponding EP Patent Application No. 18852641.2 dated Aug. 2, 2021, 7 pages.
(Continued)

*Primary Examiner* — Gil H. Lee
*Assistant Examiner* — Juan C Turriate Gastulo
(74) *Attorney, Agent, or Firm* — Greenberg Traurig, LLP

(57) ABSTRACT

An operations integration processor mapping information in a language-independent data format to a tag format for integration with a tag-based control and data acquisition system. The operations integration processor receives a response from a web service and parses the response to identify one or more attribute-value pairs contained in the response. The response contains information in a language-independent data format different than a tag format. The processor maps the parsed response to one or more tags, which have at least one of a name and a value based on the information provided in the response associated with them.

17 Claims, 10 Drawing Sheets

(51) Int. Cl.
    *G06F 16/22*     (2019.01)
    *G06F 16/16*     (2019.01)
    *G06F 16/248*     (2019.01)
    *G06F 40/117*     (2020.01)
    *H04W 4/38*     (2018.01)
    *G05B 19/418*     (2006.01)
    *H04L 67/125*     (2022.01)
    *H04L 67/133*     (2022.01)

(52) U.S. Cl.
    CPC ............ *G06F 16/168* (2019.01); *G06F 16/22* (2019.01); *G06F 16/248* (2019.01); *G06F 40/117* (2020.01); *H04L 67/125* (2013.01); *H04L 67/133* (2022.05); *H04W 4/38* (2018.02)

(58) Field of Classification Search
    CPC .............. G06F 16/972; G05B 19/4183; G05B 19/41875; H04L 67/125; H04L 67/40; H04W 4/38
    See application file for complete search history.

(56) References Cited

U.S. PATENT DOCUMENTS

| | | | |
|---|---|---|---|
| 2012/0036212 A1 | 2/2012 | McCarthy et al. | |
| 2013/0265315 A1 | 10/2013 | McGreevy et al. | |
| 2016/0217146 A1 | 7/2016 | Schmidt | |
| 2016/0378792 A1* | 12/2016 | Rashid | G06F 9/54 707/804 |
| 2017/0163480 A1* | 6/2017 | Vergara | H04L 67/02 |
| 2020/0257698 A1* | 8/2020 | Martinez | H04W 4/38 |

OTHER PUBLICATIONS

Extended European Search Report for corresponding EP Patent Application No. 18851207.3 dated Aug. 2, 2021, 7 pages.
Anonymous: "JSON response parsing in Javascript to get key/value pair [duplicate]", Aug. 25, 2016, retrieved from the Internet: URL:https://stackoverflow.com/questions/14028259/json-response-parsing-in-javascript-to-get-key-value-pair?lq=1, 5 pages.
Dossot et al., "Mule in Action", Jan. 2, 2014, URL:http://1.droppdf.com/files/dvhoY/manning-mule-in-action-2nd-2014.pdf, 86 pages.
Pautasso et al., "RESTful Web Services vs. "Big" Web Services: Making the Right Architectural Decision", Apr. 21, 2008, pp. 1-10.
International Search Report and Written Opinion for International Application No. PCT/US2018/049142, dated Nov. 30, 2018, 6 pages.

\* cited by examiner

AUTOMATIC TAG MAPPING AND GENERATION FROM DATA STRING

CROSS-REFERENCE TO RELATED APPLICATIONS

This application claims priority from U.S. Provisional Patent Application No. 62/552,580, filed Aug. 31, 2017, and from U.S. Provisional Patent Application No. 62/552,596, filed Aug. 31, 2017. The entire contents of the above-identified applications are expressly incorporated herein by reference, including the contents and teachings of any references contained therein and appendices thereto.

TECHNICAL FIELD

Aspects of the present disclosure generally relate of the fields of networked computerized industrial control automation systems and networked computerized systems utilized to monitor, log, and display relevant manufacturing/production events and associated data, and supervisory level control and manufacturing information systems. More particularly, aspects of the present disclosure relate to systems and methods for automated management of complex data feeds from industrial process equipment.

BACKGROUND

The industrial automation industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example, the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as moving equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management and process visualization techniques have been developed to handle the large volumes of data generated by such system.

In addition, as industrial processes are getting more complex and capable of processing large number of data points, information from diverse data sources are required to be included into the industrial process control system. The information may originate from different environments, such as public weather and traffic sites, or process and inventory information from a vendor site. A Web Service is a common means to expose the data.

A web service is a software program that makes itself available over the internet/intranet and uses a standardized format messaging system, such as eXtensible Markup Language (XML) or Java Script Object Notation (JSON). For instance, XML or JSON is used to encode all communications to the web service. A web service accepts requests for data following the standardized messaging protocol and responds with a XML/JSON payload based on the data that is available. The web service can also accept data payloads posted to it.

The typical data payload returned by the web service in XML or JSON format is a concatenation of name-value pairs in a complex format. Unfortunately, conventional industrial control systems are not capable of consuming the data in this raw form. Instead, developers must write complex algorithms to extract the individual components within the payload to individual name-value pairs. For example, before a tag-based control and data acquisition system can consume JSON or XML formatted web service data, a software developer must write a script or program to extract and transform information. The software developer must first analyze the JSON/XML formatted data before writing the code needed to convert the data into tag-based structures or objects consumable by the control and data acquisition system. Only after the individual components have been extracted, can they be mapped to individual references (i.e., tags or tag names) in the control system. Necessarily, the script is limited to a particular data format such that a new script must be written each time the format changes.

SUMMARY

Aspects of the disclosure permit processing a data payload in a format such as XML or JSON and automatically parameterizing each name-value component of the payload into a unique reference that can be addressed directly from industrial control software. Advantageously, processing in accordance with aspects of the present disclosure significantly enhances the availability of information to be integrated by control and data acquisition systems and provided to users. Users can thus incur less application engineering when consuming data from different web services and operate their systems more expediently and timely based on the latest information available.

A system embodying aspects of the present disclosure includes an operations integration processor and a computer-readable storage device. The system also includes an operations integration engine that comprises processor-executable instructions stored on the computer-readable storage device. The instructions, when executed by the operations integration processor, configure the operations integration engine to receive a response from a web service and parse the response to identify one or more attribute-value pairs contained in the response. In this instance, the response includes information in a language-independent data format different than a tag format. The instructions further configure the engine to map the parsed response to one or more tags, which have at least one of a name and a value based on the information provided in the response associated with them. The mapped tags are then integrated to a tag-based control and data acquisition system.

In other aspects, a computer implemented method and a computer readable storage device are provided.

Other objects and features will be in part apparent and in part pointed out hereinafter.

BRIEF DESCRIPTION OF THE DRAWINGS

FIG. 4 illustrates an exemplary graphical user interface (GUI) for configuring the retrieval and transformation of JSON data from a web service according to an embodiment.

FIG. 5 illustrates an exemplary GUI showing the results of a retrieval and transformation of JSON data from a web service according to an embodiment.

Corresponding reference characters indicate corresponding parts throughout the drawings.

DETAILED DESCRIPTION

Figure 1:
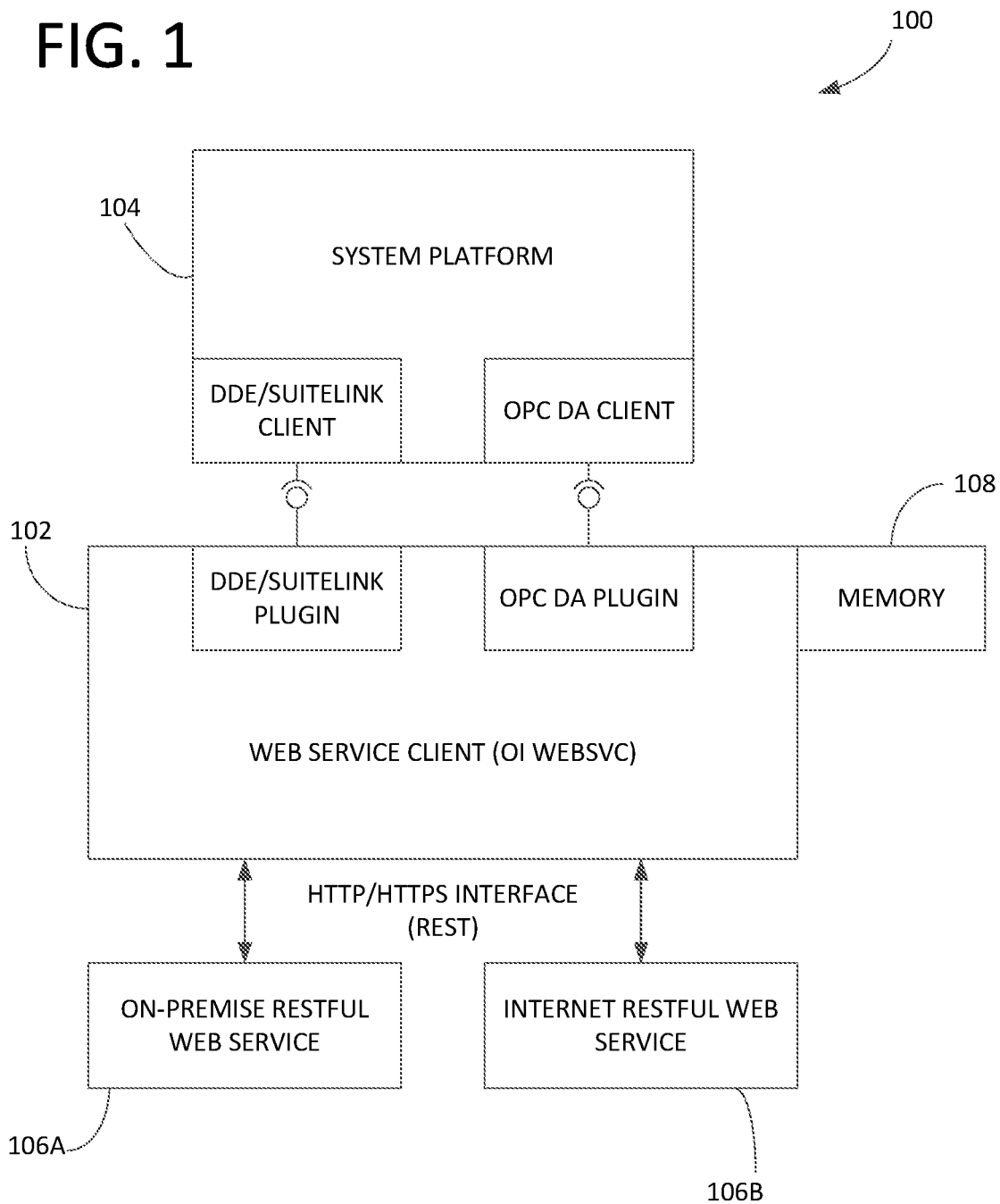
FIG. 1 is a block diagram illustrating a system architecture of a control and data acquisition system according to an embodiment.

FIG. 1 is a high level block diagram illustrating a system architecture of a control and data acquisition system 100. In the illustrated embodiment, the system 100 includes an Operation Integration (01) server 102 coupled between a system platform 104 and web services 106 (e.g., RESTful Web Services).

The system platform 102, in an embodiment, is a control system development environment that allows for the configuration, development, and deployment of applications to runtime environments on control components in industrial processes. For example, System Platform powered by Wonderware, which is available from AVEVA, provides such industrial software design and management services. It acts as a company's "industrial operating system" by providing various services including visualization, configuration, deployment, communication, security, data connectivity, data storage and management, people collaboration, and so forth.

The OI server 102 is configured to access and obtain web service data in a language-independent data format (e.g., XML or JSON data) from one or more web services 106. It is to be understood that web services 106 may be embodied by web servers, other computer systems, or the like. In an embodiment, the web service 106 is a collection of open protocols and standards used for exchanging data between applications or systems. Software applications written in various programming languages and running on various platforms can use web services 106 to exchange data over the Internet and other computer networks in a manner similar to inter-process communication on a single computer. This interoperability (e.g., between Java and Python, or Windows and Linux applications) is due to the use of open standards. In the illustrated embodiment, web services 106 include an on-premise web service 106A as well as off-premise web service 106B. For instance, web service 106B draws data from websites providing data pertaining to weather, traffic, vendor processes, vendor inventory, or the like.

In operation, OI server 102 transforms raw web services data to tags (or tag data), stores the tags in an associated memory 108, and makes the tags available to other systems, such as system platform 104 and other tag-based computer systems, for subsequent analyses and/or output to users (e.g., customers, operators, etc.). As shown in FIG. 1, OI server 102 couples to system platform 104 via a corresponding Dynamic Data Exchange (DDE)/SuiteLink client and plugin pair and/or a corresponding Open Platform Communications Data Access (OPC DA) client and plugin pair.

As described above, web service 106 returns a payload in, for example, XML or JSON format. Regardless of the format (JSON or XML), the payload is parameterized to name-value pairs. The example below illustrates an aspect of the present disclosure using JSON format.

In an embodiment, JSON data returned from web service 106 in response to a web service request takes the form of JSON objects. For example, weather data in JSON format retrieved from a web service end-point URL
api.openweathermap.org/data/2.5/forecast/
daily?q=Irvine&mode=json&units=imperial&cnt=
7&appid=Oe5d59b40817b527f9c44 a9876e26e3b
takes the form of:

{"city": {"id":5359777, "name":"Irvine", "coord":{"Ion":–117.8232, "lat":33.6695},
"country":"US", "population":0}, "cod":"200", "message":11.6719505, "cnt":7,
"list":[{"dt":1503946800, "temp":{"day":86.72, "min":72.68, "max":89.92,
"night":72.68, "eve":88.47, "morn":86.72}, "pressure":994.13, "humidity":78,
"weather":[{"id":800, "main":"Clear", "description":"sky is clear", "icon":"01d"}],
"speed":3.49, "deg":221, "clouds":0}, {"dt":1504033200, "temp":{"day":89.82,
"min":68.85, "max":94.14, "night":72.9, "eve":93.4, "morn":68.85}, "pressure":993.66,
"humidity":75, "weather":[{"id":800, "main":"Clear",
"description":"sky is clear", "icon":"01d"}], "speed":1.74, "deg":325, ...
[{"dt":1504465200, "temp":{"day":68.07, "min":66.83, "max":69.19, "night":66.83,
"eve":69.19, "morn":67.55}, "pressure":976.14, "humidity":0, "weather":[{"id":502,
"main":"Rain", "description":"heavy intensity rain", "icon":"10d"}], "speed":5.84,
"deg":118, "clouds":87, "rain":19.3}]}

Each JSON object can contain another JSON object hierarchically, and/or an array of JSON objects, and/or a series of name-value pairs. The followings are four examples of JSON objects:
1) {"name1": 10, "name2": "value2" }
2) {"name1": 20, "obj2": "objname1": 123, "objname2": 456}
3) {"name1": "value1", "arrayA": ["aaValue1", "aaValue2", "aaValue3"]}
4) {"name1": "value1", "complexArray": [{"complex1": 22, "complex2":23},{"complex3":33, "complex4": 34},{"complex5":35}]}

According to aspects of the present disclosure, system platform 104 is configured to consume JSON data exposed by web service 106 after OI server 102 has automatically mapped the JSON format data into tags for use in a tag-based control and data acquisition system, thereby eliminating the need to write scripts or programs for the web service 106. Although described herein with reference to JSON, aspects of the present disclosure include implementations using other file formats, particularly those employing attribute-value pairs (e.g., name-value, key-value, field-value, etc.).

With the proliferation of data exposed by various web services 106 in the Internet, aspects of this invention significantly enhance the availability of information that control and data acquisition systems (e.g., system platform 104) can integrate to provide to users. Users can thus incur less application engineering when consuming data from different web services 106 and can operate their systems more expediently and timely based on the latest information available.

Figure 2:
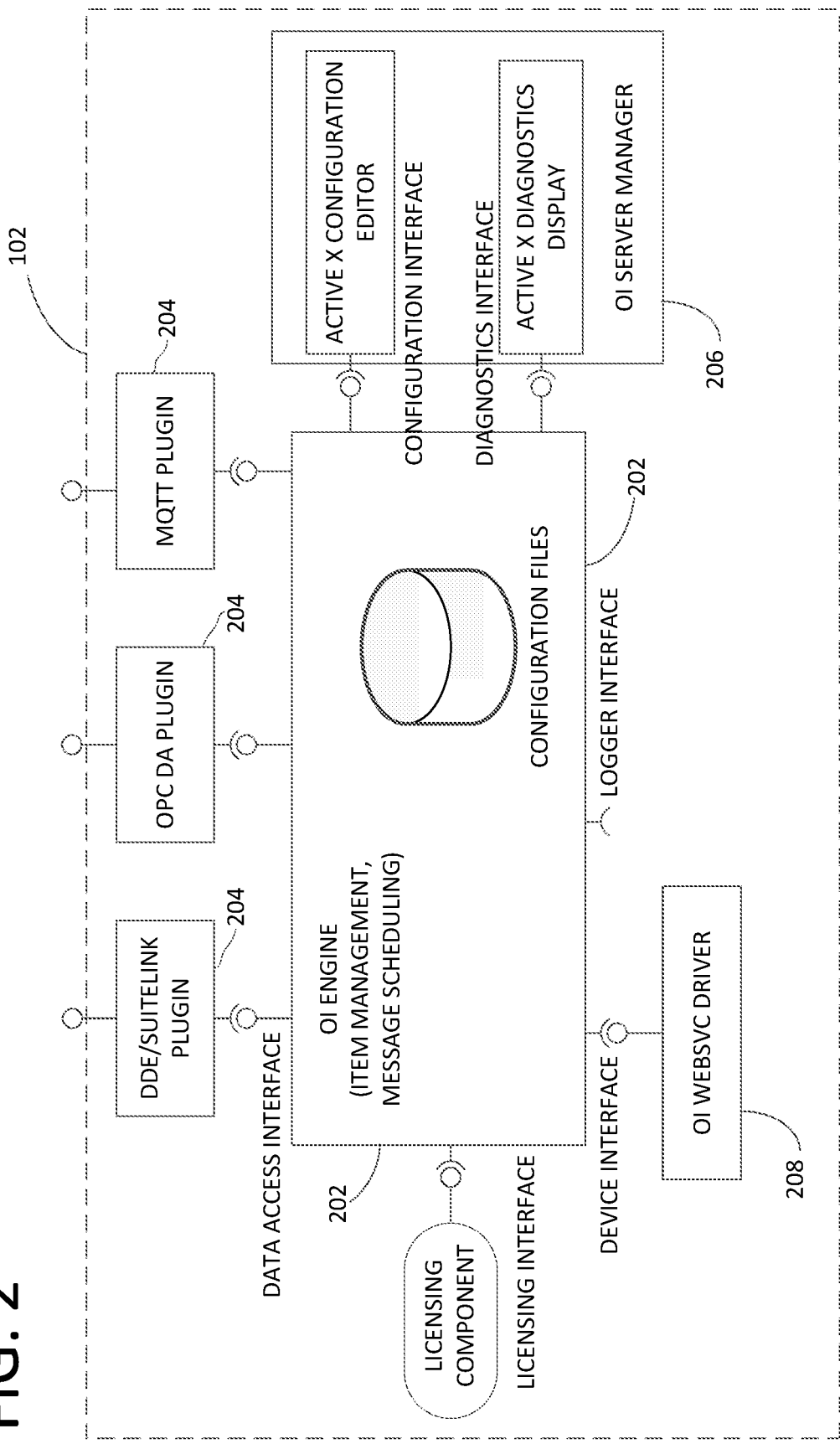
FIG. 2 is a block diagram of an operations integration server of the system of FIG. 1.

Referring now to FIG. 2, OI server 102 includes an OI engine 202 for performing various integration operations including item management, message scheduling, and so forth. In addition, OI server 102 includes a plurality of plugins 204 (e.g., Message Queue Telemetry Transport (MQTT) Plugin, DDE/SuiteLink Plugin) to interact with system platform 104 or another tag-based computer system. In an embodiment, OI server 102 provides for configuration and diagnostic interfaces with an OI server manager 206. The OI server 102 further includes a web service driver 208 (WebSvc) configured to interact with web services 106 and to implement the operations associated with the transformation of the JSON data to tags (or tag data).

In an embodiment, the feature sets of OI server 102 (WebSvc) include configuration, data providers, and runtime behavior. Configuration features include hierarchical structure, ActiveX editors, COM interface, hot configuration, multi-instance (multiple copies of same driver), tag aliasing, and validation and generation of tag names during configuration. Data providers in this embodiment include OPC DA 2.05a and DDE/SuiteLink. And runtime behaviors include enable/disable hierarchy, hierarch reset (warm start), diagnostics and logging, slow poll, and connection retry.

Figure 3:
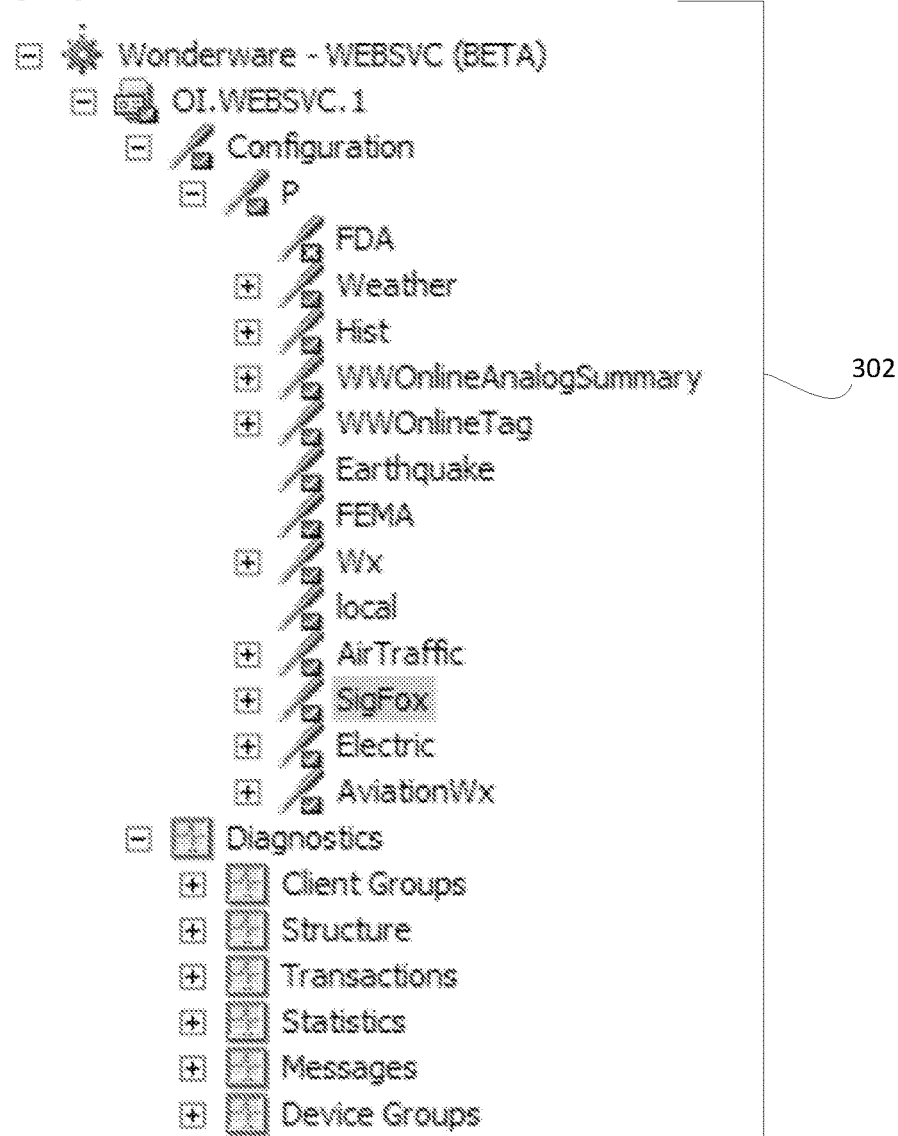
FIG. 3 illustrates an exemplary graphical display of transformed tag data from one or more web services of the system of FIG. 1.
Figure 3:
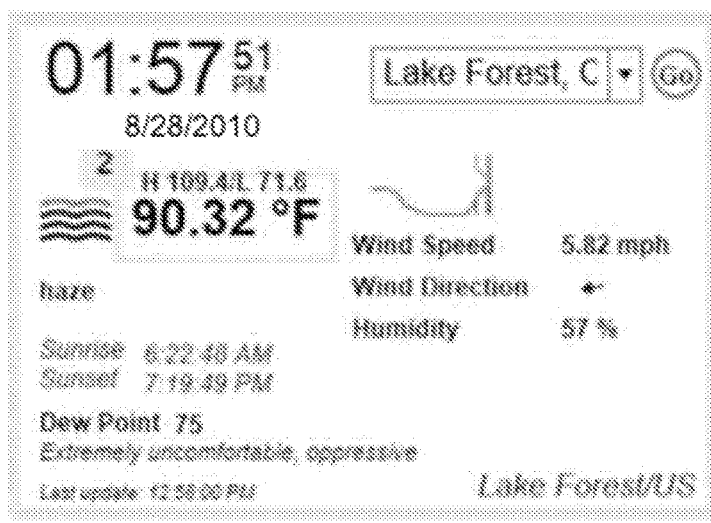

FIG. 3 shows available selectable web services 106 to receive web service data, and a graphical display 302 of transformed tag data from one or more sources (e.g., one or more web services 106, or other information sources available locally or remotely via network). In an embodiment, a widget or other GUI provides the graphical display 302, which provides live data or updated data (e.g., continuously, periodically or upon user command, etc.) to users. In this example, graphical display 302 shows the date, time, temperature, wind speed and other information for Lake Forest, which may be relevant to an operator of an industrial facility in Lake Forest. One or more of this information may be gathered from JSON-based or XML-based web service(s) 106. In addition to the graphical display, other information may similarly be provided concurrently to the operator from the control and data acquisition system 100, including data sensed or monitored from sensors (e.g., alarm sensor, pressure sensor, motion sensor, current/voltage sensor, or other types of sensors) at the industrial facility. The above is provided simply as an example. It should be understood that other types of information can be acquired, and transformed from JSON data to tags.

Figure 4:
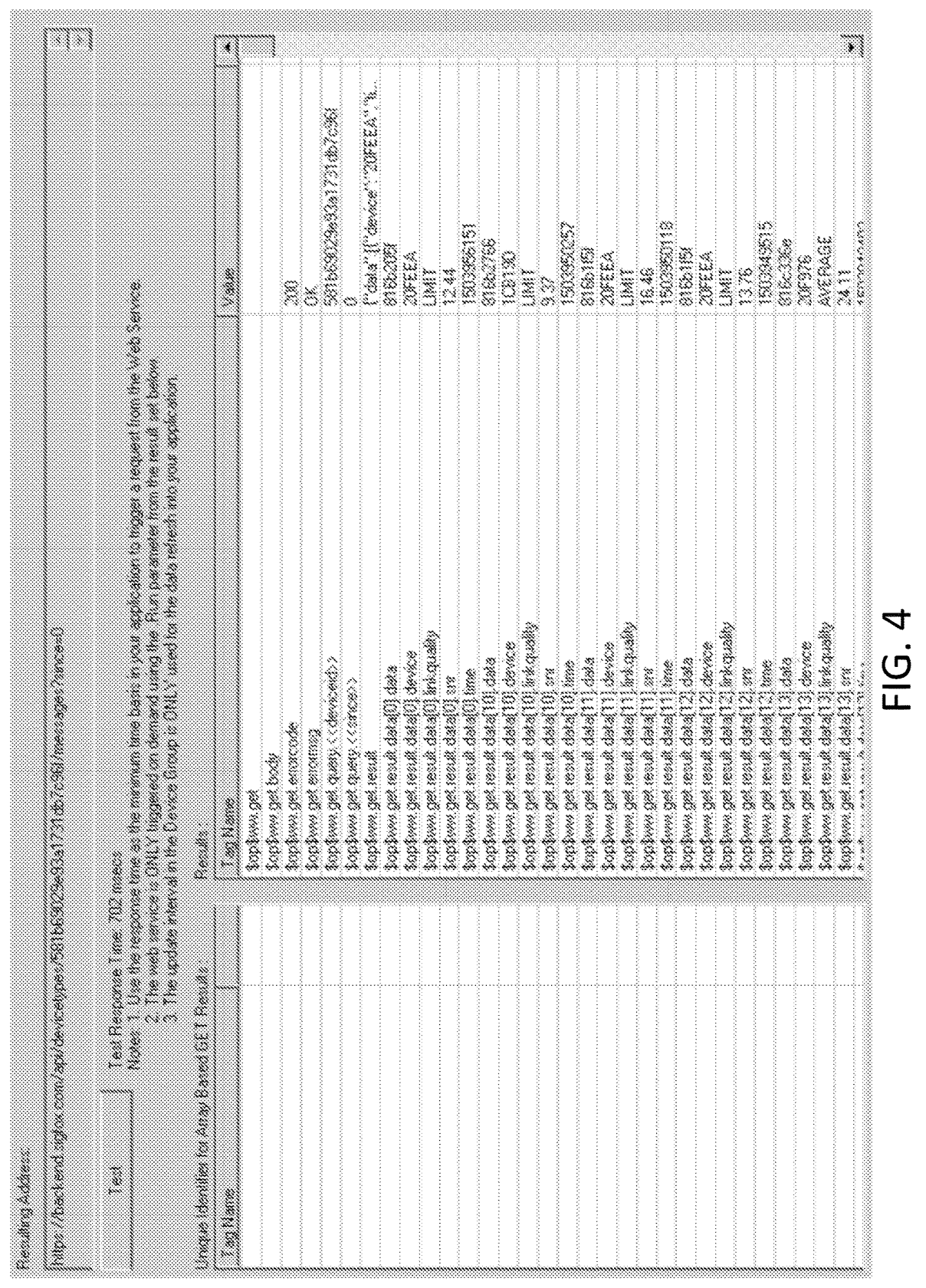

FIG. 4 illustrates an exemplary GUI for configuring the retrieval and transformation of JSON data from web service 106 (see, e.g., Web Service Address field) to tags according to an embodiment.

Figure 5:
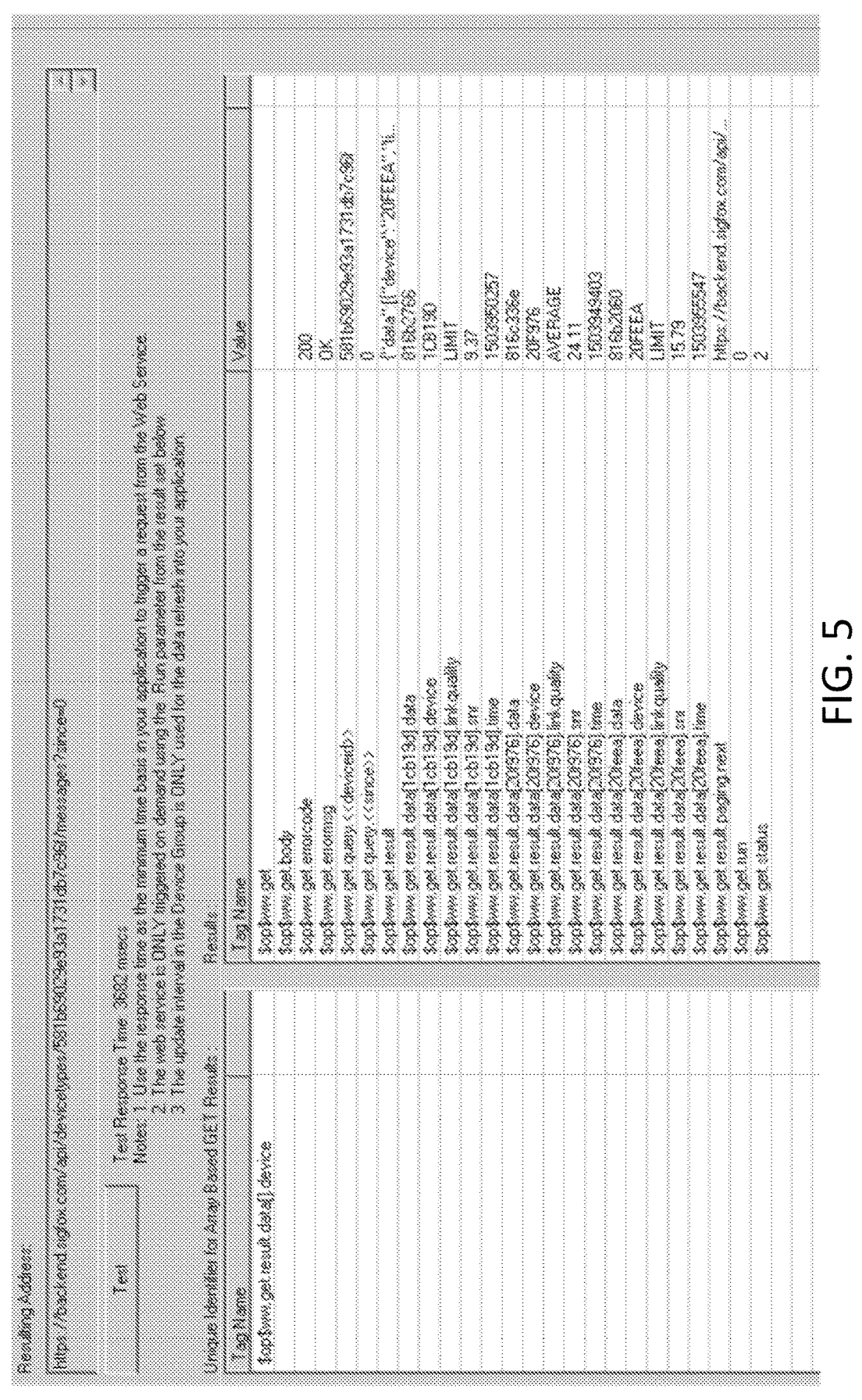

FIG. 5 illustrates an exemplary GUI showing the results of a retrieval and transformation of JSON data from web service 106 (see, e.g., Web Service Address field) according to an embodiment.

In a tag-oriented system where every data point is identified by a name, aspects of the present disclosure transform the JSON structured data into tags based on the scheme described below. For instance, OI server 102 executes computer-executable instructions stored in memory 108 to:
1) Transform a JSON object that is a name-value pair to a tag with the same name and value;
2) Transform a JSON object that is an array by appending the [x] characters after the name, where x represents the number of occurrence of the array element; and
3) Transform a JSON object that contains one or more other JSON objects by appending the . (period) after the parent JSON object name to be followed by the name of the child object name.

Figure 6:
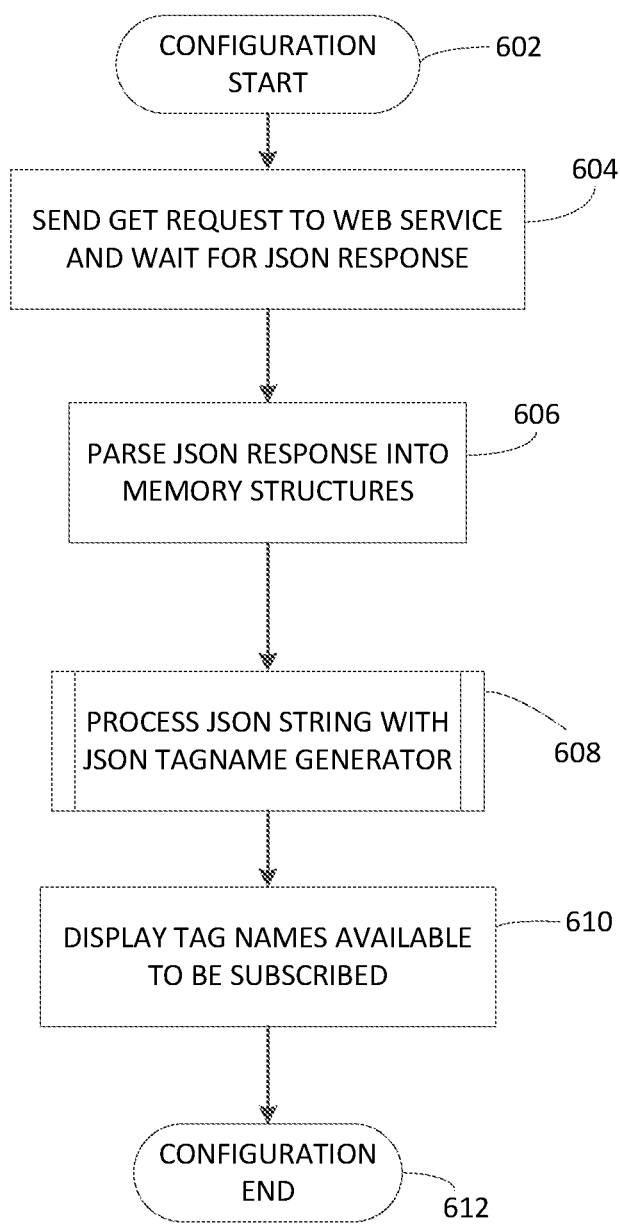
FIGS. 6 and 7 are exemplary flow diagrams of processes for configuration and runtime, respectively, in the handling of JSON data according to an embodiment.
Figure 7:
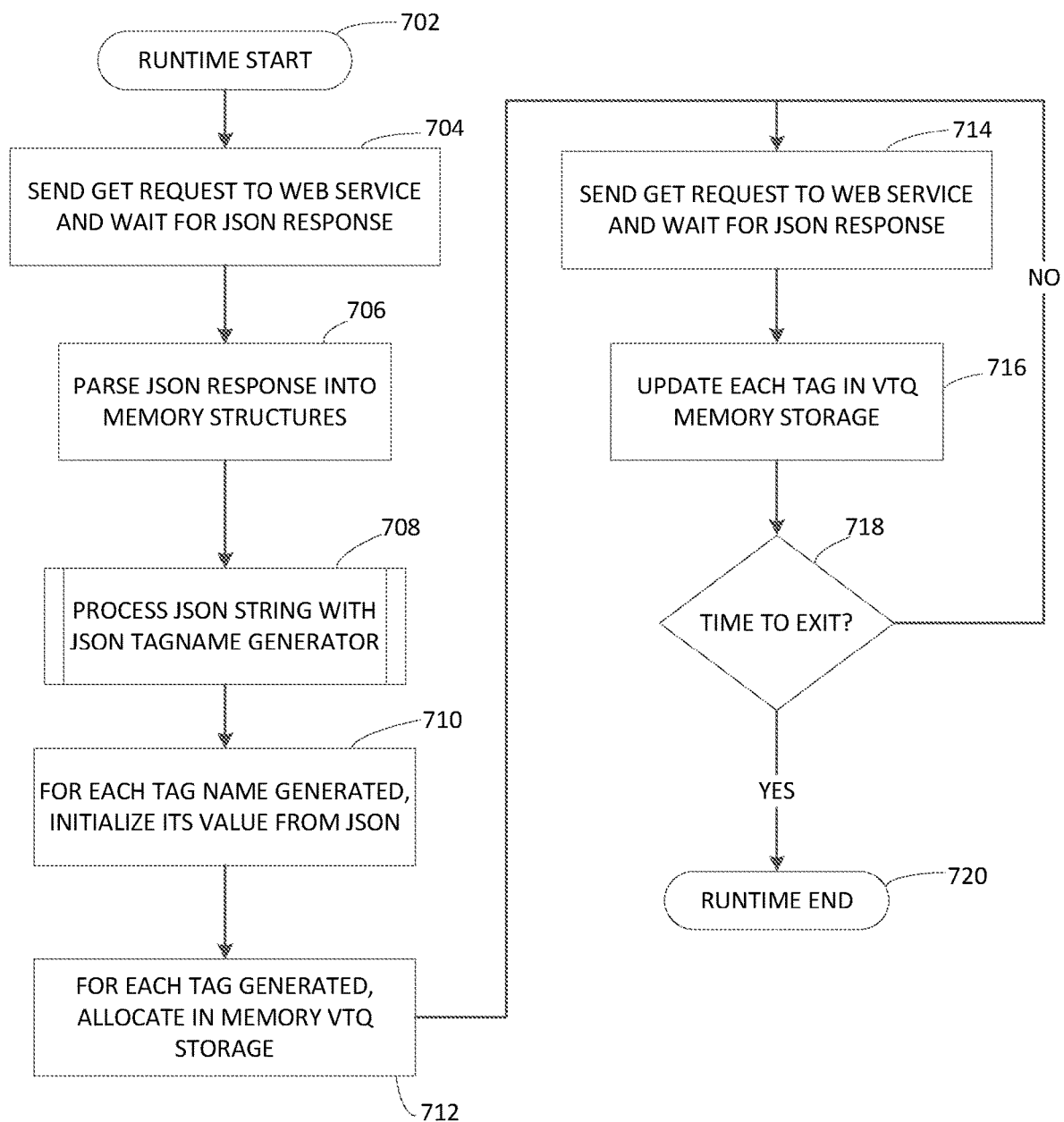

FIGS. 6 and 7 are exemplary flow diagrams of processes for configuration and runtime, respectively, in the handling of RESTful JSON data in accordance with an embodiment.

At 602 of FIG. 6, configuration begins and continues at 604 by sending a GET request to web service 106 and waiting for a JSON response. The OI server 102 executes code at 606 to parse the JSON response into memory structures and at 608 to process the JSON string with the "JSON Tagname Generator" (see FIGS. 8 and 9). Once the JSON response has been processed, the tag names that can be subscribed are then displayed. Configuration ends at 612.

As shown in FIG. 7, runtime begins at 702. Similar to configuration, OI server 102 sends a GET request to web service 106 and waits for a JSON response at 704. The OI server 102 then executes code at 706 to parse the JSON response into memory structures and at 708 to process the JSON string with the "JSON Tagname Generator." For each tag name generated, OI server 102 initializes its value from the JSON at 710 and, for each tag generated, OI server 102 allocates in memory VTQ storage at 712. Continuing at 714, OI server 102 again sends the GET request to web service 106 and waits for the JSON response and then, at 716, updates each tag in VTQ memory storage. The OI server 102 waits until the next scheduled update time and determines at 718 when it is time to exit. If so, runtime ends at 720.

Figure 8:
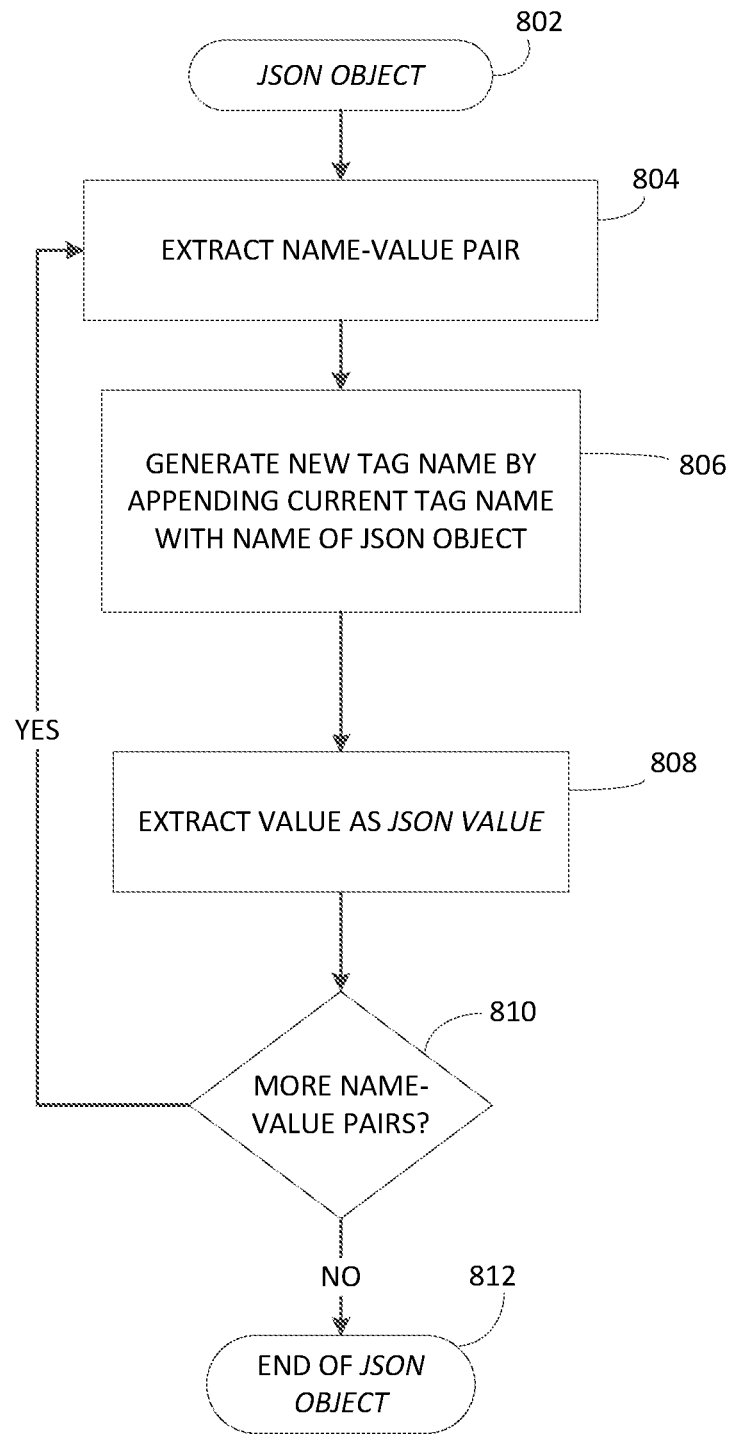
FIGS. 8, 9, and 10 are exemplary flow diagrams of processes implemented by a tag name generator for the handling of different types of JSON data according to an embodiment.
Figure 9:
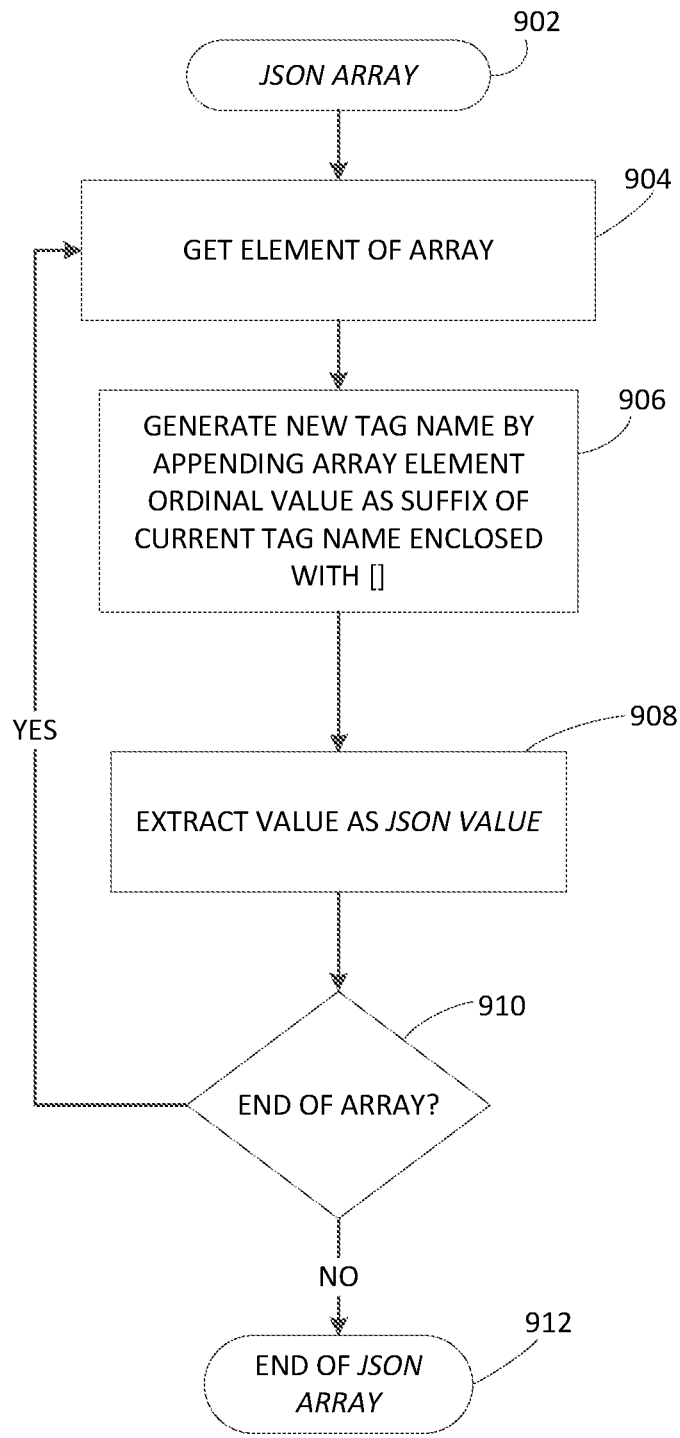
Figure 10:
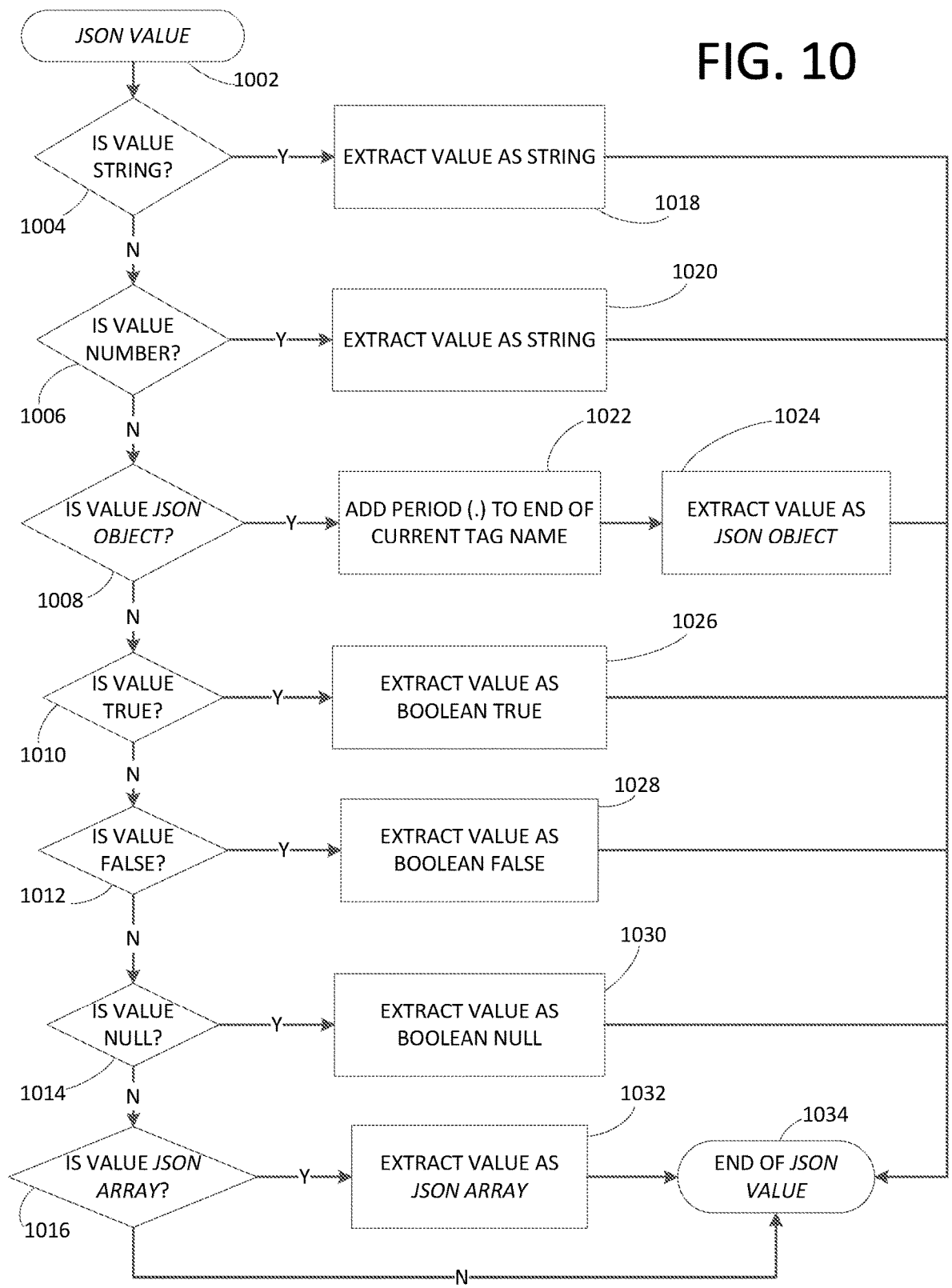

FIGS. 8, 9, and 10 are exemplary flow diagrams of processes implemented by a tag name generator for the handling of different types of RESTful JSON data (e.g., JSON object, JSON array, and JSON value, respectively) in accordance with an embodiment. Each type of JSON data may include one or more of the other types of JSON data as well. In particular, FIGS. 8 and 9 illustrate an exemplary "JSON Tagname Generator."

At 802, FIG. 8 begins with a JSON object and OI server 102 extracts the name-value pair at 804. Based on the name-value pair, OI server 102 executes code at 806 to generate a new tag name by appending the current tag name with the name of the JSON object name and executes code at 808 to extract the value of the JSON object value, referred to as the JSON value. At 810, if there are more name-value pairs, processing continues. If not, JSON object processing ends at 812.

FIG. 9 illustrates processing of a JSON array. At 902, FIG. 9 begins with a JSON array and OI server 102 gets an element of the array at 904. Based on the array element, OI server 102 executes code at 906 to generate a new tag name by appending the array element ordinal value as a suffix of the current tag name enclosed with [ ] executes code at 908 to extract the value of the JSON array value, referred to as the JSON value. As an example, if a tag name is Widget and the array element ordinal value is 7, a new tag name Widget[7] is created. At 910, if there are more arrays, processing continues. If not, JSON array processing ends at 912.

In an embodiment, OI server 102 processes the JSON value of FIGS. 8 and 9 as illustrated in FIG. 10. Beginning at 1002 with a JSON value, OI server 102 determines if the JSON value is a string at 1004 or a number at 1006 or a JSON object at 1008. The OI server 102 further analyzes the JSON value to determine if the value is true, false, or null at 1010, 1012, and 1014, respectively. At 1016, OI server 102 determines if the JSON value is a JSON array. Depending on the results of 1004-1016, processing continues. The OI server 102 extracts the value as a string at 1018 following 1004 and following 1006. If the JSON value is a JSON object at 1008, a period (.) is added to the end of the current tag name at 1022 and the value is extracted as a JSON object at 1024. For true values at 1010, OI server 102 extracts the value as Boolean true at 1026; for false values at 1012, OI server 102 extracts the value as Boolean false at 1028; and for null values at 1014, OI server 102 extracts the value as Boolean null at 1030. Following 1016, the value is extracted as JSON array at 1032. JSON value processing ends at 1034.

Referring to the examples of JSON objects above, the transformed JSON string is mapped into a series of tags as follows:

Example 1) {"name1": 10, "name2": "value2"}:

| Tag name | Tag value |
|---|---|
| name1 | 10 |
| name2 | value2 |

Example 2) {"name1": 20, "obj2": "objname1": 123, "objname2": 456}:

| Tag name | Tag value |
|---|---|
| name1 | 20 |
| obj2 | { "objname1": 123, "objname2": 456} |
| obj2.objname1 | 123 |
| obj2.objname2 | 456 |

Example 3) {"name1": "value1", "arrayA": ["aaValue1", "aaValue2", "aaValue3"]}:

| Tag name | Tag value |
|---|---|
| name1 | value1 |
| arrayA | ["aaValue1", "aaValue2", "aaValue3"] |
| arrayA[0] | aaValue1 |
| arrayA[1] | aaValue2 |
| arrayA[2] | aaValue3 |

Example 4) {"name1": "value1", "complexArray": [{"complex1":22, "complex2":23},{"complex3":33, "complex4":34},{"complex5":35}]}:

| Tag name | Tag value |
|---|---|
| name1 | Value1 |
| complexArray | [{"complex1":22, "complex2":23} ,{" complex3":33, "complex4":34},{"complex5":35}] |
| complexArray[0].complex1 | 22 |
| complexArray[0].complex2 | 23 |
| complexArray[1].complex3 | 33 |
| complexArray[1].complex4 | 34 |
| complexArray[2].complex5 | 35 |

Example Architecture:

Referring again to FIGS. 1-10, an exemplary system architecture embodying aspects of the present disclosure includes various components, such as the control and data acquisition system, or system platform 104, and OI server 102. These components may operate on one or more computers (or computerized systems), such as servers or the like. The computers may be connected across a network(s), and include at least a processor(s) (e.g., CPUs), memory, and network interface device(s) (NIDs). The web services 106 may be provided via a network (e.g., Internet, etc.) to user devices, which may be computers including at least a processor(s) (e.g., CPUs, controllers, etc.), memory, NID, output device (e.g., display, speaker, etc.). The memory (e.g., a data storage device(s)) can store data or information, such as applications or programs or code (executable on one or more processors), configuration files, and/or other data and information to provide the various functions, operations, features and services described herein.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

Those skilled in the art are familiar with the JSON text format, which facilitates structured data interchange and is used by web services 106 in the illustrated embodiments to expose their data. JSON syntax consists of braces, brackets, colons and commas and the data can be organized in arrays and in hierarchical manner. Each JSON string is identified by an object or array of objects. Each JSON object contains a series of name-value pair.

REST refers to REpresentational State Transfer, which is a web standards-based architecture and uses Hypertext Transfer Protocol (HTTP) for data communication. In REST architecture, a REST Server is configured to provide access to resources; and the REST client is configured to access and present the resources. The resources are identifiable by universal or uniform resource identifiers (URIs)/Global IDs. REST can use various representations to represent a resource like JSON. Those skilled in the art are familiar with the following HTTP methods for use by a REST-based architecture:

GET—Provides a read only access to a resource.
PUT—Used to create a new resource.
DELETE—Used to remove a resource.
POST—Used to update an existing resource or create a new resource.
OPTIONS—Used to get the supported operations on a resource.

Web Services based on REST Architecture are known as RESTful Web Services. These Web Services use HTTP methods to implement the concept of REST architecture. A RESTful Web Service usually defines a URI, which is a service that provides resource representation such as JSON and a set of HTTP methods.

The tag matching approach described herein can be employed with RESTful based web services or other web services involving JSON.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Embodiments of the disclosure may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:
1. A system comprising:
an operations integration processor;
one or more non-transitory computer-readable storage devices;
an operations integration engine, wherein the operations integration engine comprises instructions stored on the one or more non-transitory computer-readable storage devices, wherein the instructions, when executed by the operations integration processor, configure the operations integration engine to:
  receive a response from a web service, wherein the response includes information in a language-independent data format different than a tag format;
  parse the response to identify one or more attribute-value pairs contained in the response;

map the parsed response to one or more tags, each of the mapped tags having a value based on the information provided in the response, the value being updated when the response from the web service is updated;

generate a new tag name for each of the mapped tags based on the information provide in the response;

integrate the one or more mapped tags to a tag-based control and data acquisition system; and display at least one mapped tag and corresponding generated tag name in a graphical display within a graphical user interface, the graphical display being updated in response to the value being updated when the response from the web service is updated.

2. The system of claim 1, wherein the instructions, when executed by the operations integration processor, further configure the operations integration engine to:

receive an updated response from the web service, wherein the updated response is provided at least one of continuously, periodically, upon a user request, and upon a triggering event; and update the at least one of the name and the value associated with the mapped one or more tags based on information provided in the updated response.

3. The system of claim 1, wherein the language-independent data format different than the tag format is at least of extensible Markup Language (XML) and Java Script Object Notation (JSON).

4. The system of claim 1, wherein the instructions, when executed by the operations integration processor, further configure the operations integration engine to:

receive instructions defined by a user to subscribe to selected tags from a plurality of the mapped one or more tags.

5. The system of claim 1, wherein the instructions, when executed by the operations integration processor, further configure the operations integration engine to:

send a GET request to the web service, wherein receiving the response from the web service is responsive to the GET request.

6. The system of claim 1, wherein the instructions, when executed by the operations integration processor, further configure the operations integration engine to:

initialize a value for each new tag name to the value from the information provided in the response.

7. A computer implemented method comprising:

providing one or more non-transitory computer-readable storage devices with instructions stored thereon that cause one or more computers to implement the steps of:

receiving a response from a web service, wherein the response includes information in a language-independent data format different than a tag format;

parsing the response to identify one or more attribute-value pairs contained in the response;

mapping the parsed response to one or more tags, each of the mapped tags having a value based on the information provided in the response, the value being updated when the response from the web service is updated; generating a new tag name for each of the mapped tags based on the information provide in the updated;

integrating the one or more mapped tags to a tag-based control and data acquisition system; and displaying at least one mapped tag and corresponding generated tag name in a graphical display within a graphical user interface, the graphical display being updated in response to the value being updated when the response from the web service is updated.

8. The computer implemented method of claim 7, further comprising:

receiving an updated response from the web service, wherein the updated response is provided at least one of continuously, periodically, upon a user request, and upon a triggering event; and updating the at least one of the name and the value associated with the mapped one or more tags based on the information provided in the updated response.

9. The computer implemented method of claim 7, wherein the language-independent data format different than the tag format is at least of extensible Markup Language (XML) and Java Script Object Notation (JSON).

10. The computer implemented method of claim 7, further comprising:

receiving instructions defined by a user to subscribe to selected tags from a plurality of the mapped one or more tags.

11. The computer implemented method of claim 7, further comprising:

sending a GET request to the web service, wherein receiving the response from the web service is responsive to the GET request.

12. The computer implemented method of claim 7, further comprising:

initializing a value for each new tag name to the value from the information provided in the response.

13. One or more non-transitory computer-readable storage devices having instructions stored thereon including instructions that, when executed by an operations integration processor, implement an operations integration engine for automated tag mapping in an industrial process, the operations integration engine configured to:

receive a response from a web service, wherein the response includes information in a language-independent data format different than a tag format;

parse the response to identify one or more attribute-value pairs contained in the response; and map the parsed response to one or more tags, each of the mapped tags having a value based on the information provided in the response, the value being updated when the response from the web service is updated;

generate a new tag name for each of the mapped tags based on the information provided in the response; and display at least one mapped tag and corresponding generated tag name in a graphical display within a graphical user interface, the graphical display being updated in response to the value being updated when the response from the web service is updated.

14. The one or more non-transitory computer-readable storage devices of claim 13, wherein the instructions, when executed by the operations integration processor, further configure the operations integration engine to:

receive an updated response from the web service, wherein the updated response is provided at least one of continuously, periodically, upon a user request, and upon a triggering event; and update the at least one of the name and the value associated with the mapped one or more tags based on the information provided in the updated response.

15. The one or more non-transitory computer-readable storage devices of claim 13, wherein the language-independent data format different than the tag format is at least of extensible Markup Language (XML) and Java Script Object Notation (JSON).

16. The one or more non-transitory computer-readable storage devices of claim 13, wherein the instructions, when executed by the operations integration processor, further configure the operations integration engine to:
receive instructions defined by a user to subscribe to selected tags from a plurality of the mapped one or more tags.

17. The one or more non-transitory computer-readable storage devices of claim 13, wherein the instructions, when executed by the operations integration processor, further configure the operations integration engine to:
initialize a value for each new tag name to the value from the information provided in the response.

* * * * *